June 6, 1961     H. W. TROEGER     2,986,983

SELF-SETTING SHUTTER WITH FLASH SYNCHRONIZATION

Filed Feb. 7, 1958

INVENTOR.
HANS W. TROEGER
BY
ATTORNEYS

United States Patent Office 2,986,983
Patented June 6, 1961

2,986,983
SELF-SETTING SHUTTER WITH FLASH SYNCHRONIZATION
Hans W. Troeger, Binghamton, N.Y., assignor to General Aniline & Film Corporation, New York, N.Y., a corporation of Delaware
Filed Feb. 7, 1958, Ser. No. 713,921
4 Claims. (Cl. 95—59)

This invention relates to photographic shutters and, more particularly, to an improvement in shutters of the single-leaf type.

Photographic shutters in simple cameras are generally of the self-setting type, i.e., the shutter spring-tension mechanism is placed in operating position by the motion of the release lever as it is depressed to a predetermined extent of its complete arcuate path. Beyond this movement of the release lever, the tension mechanism becomes disengaged therefrom and returns by the force of the tensioned spring to momentarily dislocate the shutter leaf.

In certain shutter mechanisms designed to operate in the manner outlined above, no difficulty will be experienced in normal shutter movement provided that the release lever is firmly depressed to the full extent of its travel by the user. However, should the inexperienced user hesitate and permit this release lever to return to its original position before being completely depressed, a false operation will result. The shutter leaf will then be moved to uncover the lens aperture as long as the release lever is held in one position and while it is returned by the indextrous hand of the user.

A type of shutter in which false operation may be effected by partial pressing of the release lever is described in U.S. application, S.N. 335,375, filed February 5, 1953, entitled "Self-Setting Shutters With Flash Synchronization," now Patent Number 2,909,976.

It is the primary object of this invention to improve the constructional features of shutters of the type described in the above application and thereby eliminate the disadvantage of false operation.

A particular feature of the invention is that the desired improvement may be accomplished by simple modification of a single operating element of the shutter.

Other objects and features will be apparent from the following description of the invention, pointed out in particularity in the appended claims and taken in connection with the accompanying drawing, in which:

Figure 1:
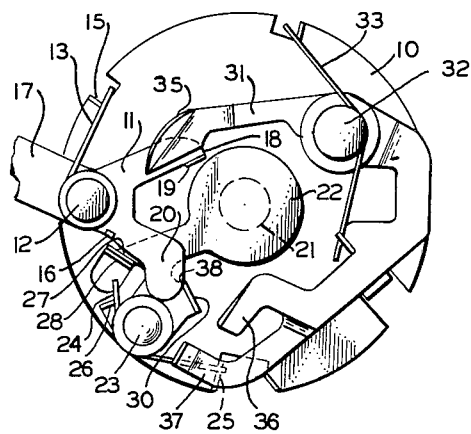
FIG. 1 is a plan view of a self-setting shutter in rest position incorporating the invention.

Referring to the figures, the operating elements of the shutter are shown mounted on the base plate 10 and consist of the shutter release trigger 11 pivoted over the stud 12 in the plate 10. The lever 11 is biased by the spring 13 which is wound around the stud 12 and tensioned between lug 15, formed of a bent-up portion of the base plate 10, and lug 16 carried by the lever 11. The latter has an outwardly extending arm 17 which forms the release lever for the manual operation of the shutter and an inwardly extending toe portion 18 with a vertically extending lug 19 for the trigger action.

The configuration of the trigger 11 includes also an L-shaped downwardly extending arm 20, the purpose and function of which will be explained later. It is to be noted, however, that the arm 20 plays an important part in preventing the false operation of the shutter.

Centrally in the base plate 10 and covering the aperture 21 is the shutter leaf 22 pivoted over the stud 23 carried by the base plate 10. A spring 24 is tensioned between lug 25 in the base plate 10 and lug 26 of the shutter leaf holding it in aperture covering position. There is provided a stop 27 on the leaf 22 which cooperates with a lug 28 in the base plate whereby the leaf is retained in closed position unless moved by the shutter mechanism. The leaf 22 is also locked in this position, the lug 27 being held against the lug 26 by the lug 16 of the trigger 11. Therefore, the shutter leaf cannot be moved unless the trigger is actuated.

Figure 3:
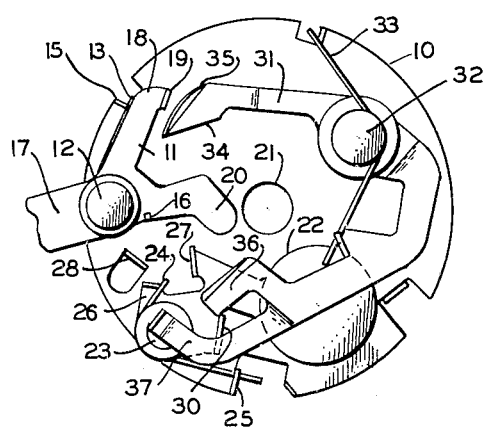
FIG. 3 is a plan view of the same shutter at the instant of shutter opening.

The shutter leaf 22 carries the actuating cam which extends vertically therefrom and is engaged by the arm 36 of the master member 31. The latter is pivoted over the stud 32 in the base plate 10 and is biased by the spring 33 in a manner similar to the other pivoted elements. The master member 31 is a V-shaped bell crank having an upper arm terminating in a straight edged portion 34 which engages the lug 19 of the toe 18 of the release trigger 11 and from which it can slip off when the lever 17 is fully depressed, as seen in FIG. 3. The portion 34 has a bent-up part 35 under which the lug 19 may slide for re-engagement with the upper arm. The lower arm of the master member 31 terminates in a forked end of which the shorter is the actuating arm 36 and the longer inwardly bent portion is the contact finger 37 which closes the contact for synchronized flash ignition when it engages the stud 23 in its return movement.

In referring to the operation of the shutter, the figures may be inspected in sequential order. It is seen in FIG. 1 that the shutter leaf 22 is free from engagement and is covering the aperture 21. Now, when the release lever 17 is depressed, the lug 19 of the toe 18 of the finger 11 engages the edge 34 of the upper arm of the master member 31 and constrains the latter to move around the pivot. The actuating arm 36 of the master member 31 riding over the cam 30 is lifted thereby until it engages the arm 20 and rests thereon. In this position, the arm 36 is not engaging the cam 30. Upon further downward movement of the release lever 17 by the user, a point is reached when the lug 19 of the toe portion 18 clears the edge 34 of the master member 31. At this instant, the latter is free to return. At the same time, the arm 20 has been displaced sufficiently to allow the arm 36 of the master member to drop down and engage the face 38 of the cam 30. When this occurs, the energy stored in the spring 33 will move the master member 31 over the pivot 32 and the arm 36 thereof, hooked against the side 38 of the cam 30, will constrain the shutter leaf 22 to pivot over the stud 23. The aperture is thus uncovered until the motion of the master member 31 progresses beyond the distance required for the arm 36 to be disengaged from the side 38 of the cam 30. When this occurs, the leaf 22 becomes free to return, by virtue of its spring loading, to closed position. The above sequence of operation provides a momentary uncovering and subsequent covering of the aperture by the shutter leaf 22 which is generally in the order of $\frac{1}{25}$–$\frac{1}{50}$ of a second.

Figure 4:
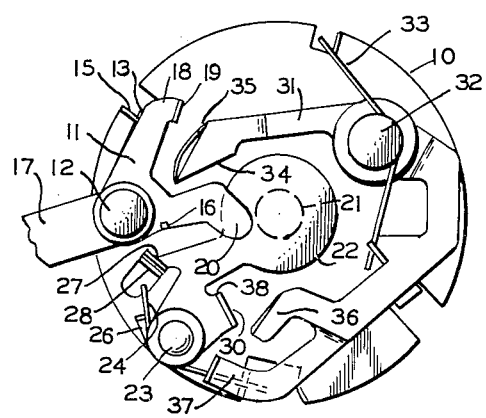
FIG. 4 is a plan view of the shutter showing completion of the exposure and prior to resetting of the release trigger.

In the sequence illustrated in FIG. 3, it is seen that the master member 31 has moved the shutter leaf 22 into uncovering position and is about to slip off the face 38 of the cam 30; whereas, in FIG. 4, the leaf 22 has been freed and returned to cover the aperture again. The release lever 17 is still in a depressed position. An exposure has just been made and when the release lever 17 is no longer held down by the operator, it will return, by virtue of the spring 13, to the position shown in FIG. 1. The toe 18 of the trigger 11 is moved under the bent-up portion 35 so that the toe portion 19 again engages the face 34 of the master member 31.

Figure 2:
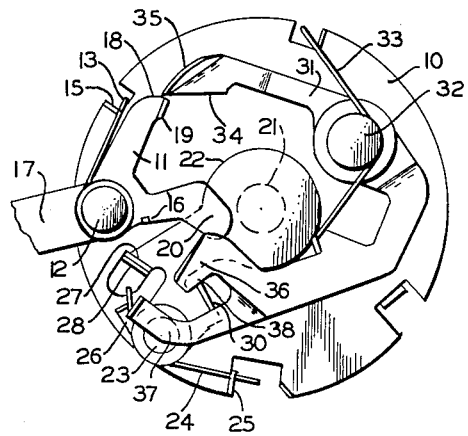
FIG. 2 is a plan view of the same shutter in tensioned position about to be released.

In the position shown in FIG. 2, if the release lever 17 is allowed to go back slowly, false operation will not occur. The reason for this is that the arm 20 prevents the arm 36 from engaging the cam 30. On the other hand, the shutter disclosed in application S.N. 335,375, filed February 5, 1953, under the same condition the arm 36 would be engaging the cam 30 so that if the release lever 17 is slowly allowed to go back, the shutter leaf 22 will be moved to uncover the aperture and remain in this position until sufficient return movement is effected for the arm 36 to clear the cam 30, permitting the leaf 22 to return into aperture covering position.

I claim:

1. A self-setting photographic shutter comprising a base plate having an exposure aperture, a shutter leaf pivoted over a stud in said plate and swingable past said aperture, a shutter release trigger and a master member, individual pivoted supports in said plate for said trigger and for said member including spring biasing means holding them in rest position, said trigger having a toe portion in slip-off engagement with said master member, said leaf having a cam lifting said master member upon setting movement into operative engagement for swinging said leaf upon return movement of said member and holding means associated with said trigger for preventing said operative engagement while said toe portion engages said master member.

2. A self-setting photographic shutter in accordance with claim 1 wherein said holding means comprises a downwardly extending arm of said shutter release trigger.

3. A self-setting photographic shutter in accordance with claim 1 wherein said holding means is so positioned as to move under said master member preventing engagement of said cam until said toe portion slips off said master member.

4. A self-setting photographic shutter in accordance with claim 2 wherein said holding means is so positioned as to move under said master member preventing engagement of said cam until said toe portion slips off said master member.

References Cited in the file of this patent

UNITED STATES PATENTS

| | | |
|---|---|---|
| 1,925,567 | Riddell | Sept. 5, 1933 |
| 2,469,688 | Fuerst | May 10, 1949 |
| 2,537,888 | Fuerst | Jan. 9, 1951 |
| 2,627,214 | Pirwitz | Feb. 3, 1953 |